United States Patent
Rising

[19]

[11] Patent Number: 5,806,463
[45] Date of Patent: Sep. 15, 1998

[54] AQUARIUM SWEEPER APPARATUS AND SYSTEM

[76] Inventor: Kelly W. Rising, 2070 Savanna Trace, Beaumont, Tex. 77006

[21] Appl. No.: 700,311

[22] Filed: Aug. 12, 1996

[51] Int. Cl.⁶ .................................................. A01K 63/04
[52] U.S. Cl. ................. 119/264; 15/246.5; 15/250.24; 119/245
[58] Field of Search ...................... 119/264, 245; 15/1.7, 103, 246.5, 49.1, 50.1, 250.24

[56] References Cited

U.S. PATENT DOCUMENTS

| | | | |
|---|---|---|---|
| 3,505,702 | 4/1970 | Omile | 15/250.17 |
| 3,999,242 | 12/1976 | Maruyama et al. | 15/302 |
| 4,595,866 | 6/1986 | Fukatsu et al. | 318/444 |
| 4,914,773 | 4/1990 | Ham | 15/3 |
| 4,978,447 | 12/1990 | Hall | 210/541 |
| 5,179,911 | 1/1993 | Chow et al. | 199/5 |

OTHER PUBLICATIONS

J. Charles Delbeek and Julian Sprung, "The Reef Aquarium: A Comprehensive Guide to the Identification and Care of Tropical Marine Invertibrates," pp. 100–102, 265, 326, and 485, vol. 1.

Julian Sprung, "Reef Notes," 1989/1990, pp. 138–140 and 166.

*Primary Examiner*—Edgar S. Burr
*Assistant Examiner*—Dave A. Ghatt
*Attorney, Agent, or Firm*—Arnold White & Durkee

[57] ABSTRACT

An apparatus and system for cleaning an aquarium viewing surface involving a sweeping mechanism that includes a cleaning surface (such as a cleaning belt) and a drive mechanism that causes the sweeping mechanism to traverse the viewing surface on a regular basis to bring the cleaning surface in contact with the viewing surface to clean the viewing surface of, for example, unwanted algae.

25 Claims, 10 Drawing Sheets

FIG. 10

AQUARIUM SWEEPER APPARATUS AND SYSTEM

FIELD OF THE INVENTION

The present invention relates generally to aquarium sweeper apparatus and system and more particularly to an apparatus for removing unwanted algae accumulation on the viewing surfaces of an aquarium.

BACKGROUND OF THE INVENTION

Most all individuals who maintain aquarium systems struggle with unwanted growths of algae that periodically and regularly appear on the viewing surfaces of the aquarium. The growth of "nuisance" algae typically requires all aquarium owners to include in their regular tank maintenance schedules the removal of unwanted algae. Such algae accumulation can result in poor tank visibility and can detract from the overall aesthetics of the aquarium system.

The rate and extent of algae growth can vary from aquarium system to aquarium system. The nuisance algae problem is particularly acute in maintaining systems for living marine life because the high intensity light used in such systems accelerates the rate of algae growth.

In many instances, undesirable algae growth is removed by physically scraping the algae off of the viewing surface with, for example, a special scraping device, a toothbrush or an algae pad. In many instances, algae scrapings are performed each day. Such "manual-scraping" algae removal techniques are undesirable because they tend to be tiresome and time-consuming and because physical contact with the aquarium contents can promote disease of the aquarium's inhabitants and impede desirable growth by introducing unwanted contaminates (e.g., oils form the skin, perfume, etc.) into the aquarium environment. Also, scraping removal techniques can result in a scratching of the aquarium viewing surface (especially in acrylic systems) that diminishes the aesthetics of the system.

A further limitation of manual-scraping removal techniques is that they require the physical presence of an individual to perform the scraping operation. This can unnecessarily "tie" an aquarium owner to his aquarium or result in intensive (and possibly damaging) post-vacation cleaning binges.

It is an objective of the present invention to overcome these and other limitations in existing systems.

SUMMARY OF THE INVENTION

The present invention provides an automated, non-manual system for removing unwanted algae from aquarium systems without detracting from the overall aesthetics of the system.

DETAILED DESCRIPTION OF THE INVENTION

Figure 1A:
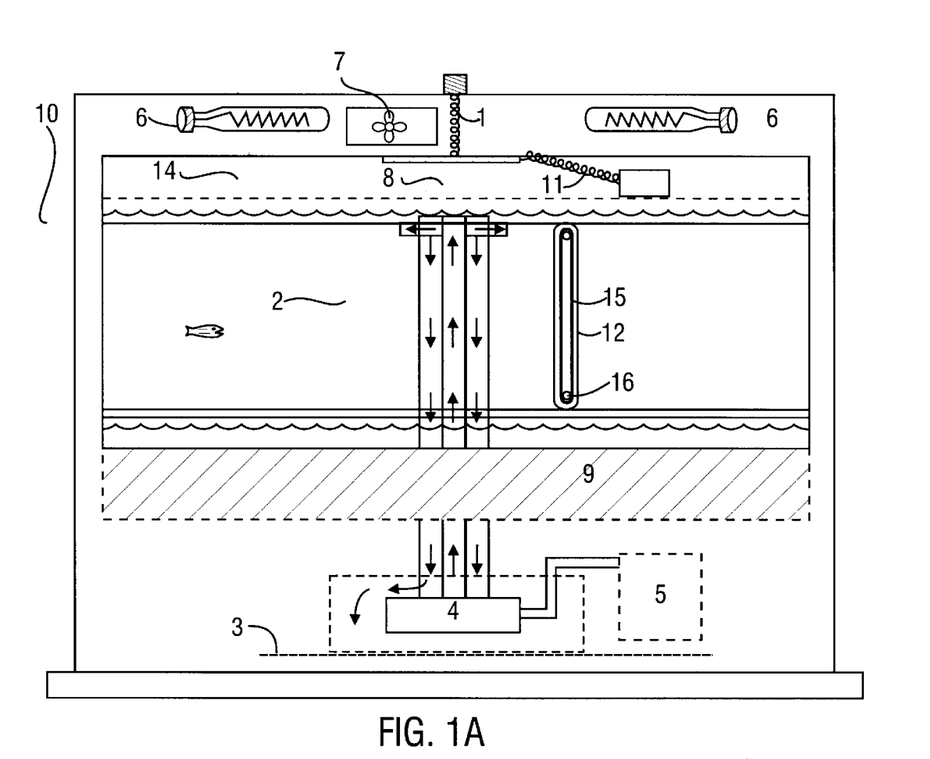
FIGS. 1A and 1B illustrate an automated algae removal system 10 in accordance with the present invention in the context of a wall-mounted aquarium system.
Figure 1B:
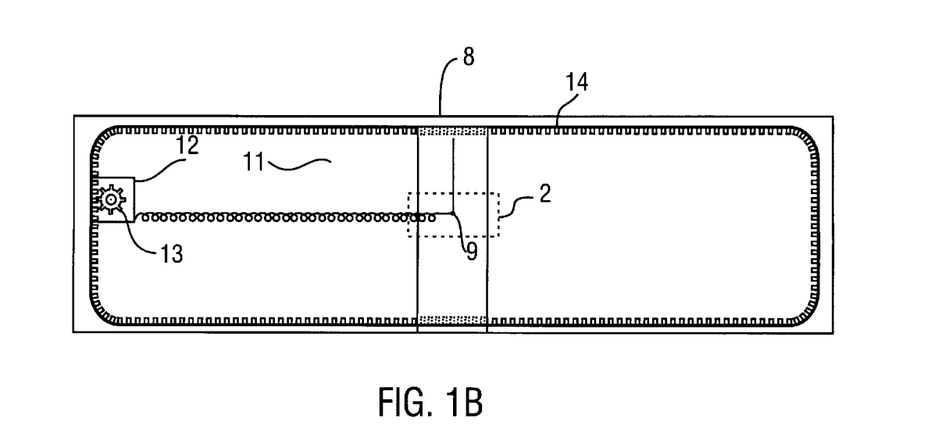

Turning to the drawings and, in particular, to FIGS. 1A and 1B, an automated algae removal system 10 is disclosed in the context of a wall-mounted aquarium system. In general, the system 10 includes an aquarium tank that is particularly enclosed in a wall recess such that there is a single viewing surface for observing the contents of the aquarium. Although the exemplary tank of FIGS. 1A and 1B is partially enclosed and has only one viewing surface, the present invention is equally applicable to tanks with two, three, four or more viewing surfaces such as a cube-shaped tank placed in the center of a room. A tank overflow apparatus 2 is positioned within the center of the tank in the example of FIGS. 1A and 1B although it may be placed in other locations (e.g., a corner) as long as it does not obstruct operation of the sweeping mechanism discussed below. Tank overflow apparatus 2 may be of the conventional type to provide a mechanism for providing water to the tank and for returning water from the tank to a pump 3. A main return pump 4 and a filter system 5 is coupled to the overflow apparatus 2. The construction of the pump 3, return pump 4 and filter system 5 may be conventional. Filter 5 may include a protein skimmer, a canister filter or the like. Light hoods 6 and a cooling fan 7 are positioned above the viewing surface of the aquarium system 10 to provide light for viewing the contents of the aquarium system and to provide cooling.

A tank support member 8, of the type standard in most large aquariums, is positioned above the overflow apparatus 2 and a swivel mechanism 9 is coupled to the support member 8. A coiled power cord 11 is coupled to a sweeper mechanism 12 via the swivel mechanism 9. The power cord receives its power from a waterproof plug that may be positioned within rail 14.

Sweeper mechanism 12 includes an electric motor coupled to cog member 13 that is positioned within a circumferential tooth rail 14 that is positioned within the inner surfaces of the aquarium tank. A cleaning belt 15 is coupled to the electric motor via a rigid arm and a protective housing 16 surrounds the belt.

Rail 14 surrounds the periphery of the tank. To promote thorough cleaning of the viewing surfaces, a tank having rounded corners is desirable such that the rail 14 creates a smooth round in the tank. For square tanks, the rail 14 should be rounded in the corners but, as will be apparent from the discussion of sweeper mechanism 12, such rounding may result in "unclean" corner areas. These "unclean" areas may, however, be concealed by side corner moldings and could be cleaned on a relatively infrequent basis.

In general, electrical power is transferred to the electric motor of the sweeper mechanism to cause the motor to move the cog member 13 such that the sweeper mechanism 12 moves across the visible surface of the aquarium causing the cleaning belt 15 to brush against the surface of the aquarium, removing unwanted algae. At times when the sweeping mechanism 12 is not activated (i.e., the motor is not energized), the sweeping mechanism may be positioned in a non-visible corner of the aquarium such that aquarium visibility is not affected by the sweeping mechanism.

Figure 2:
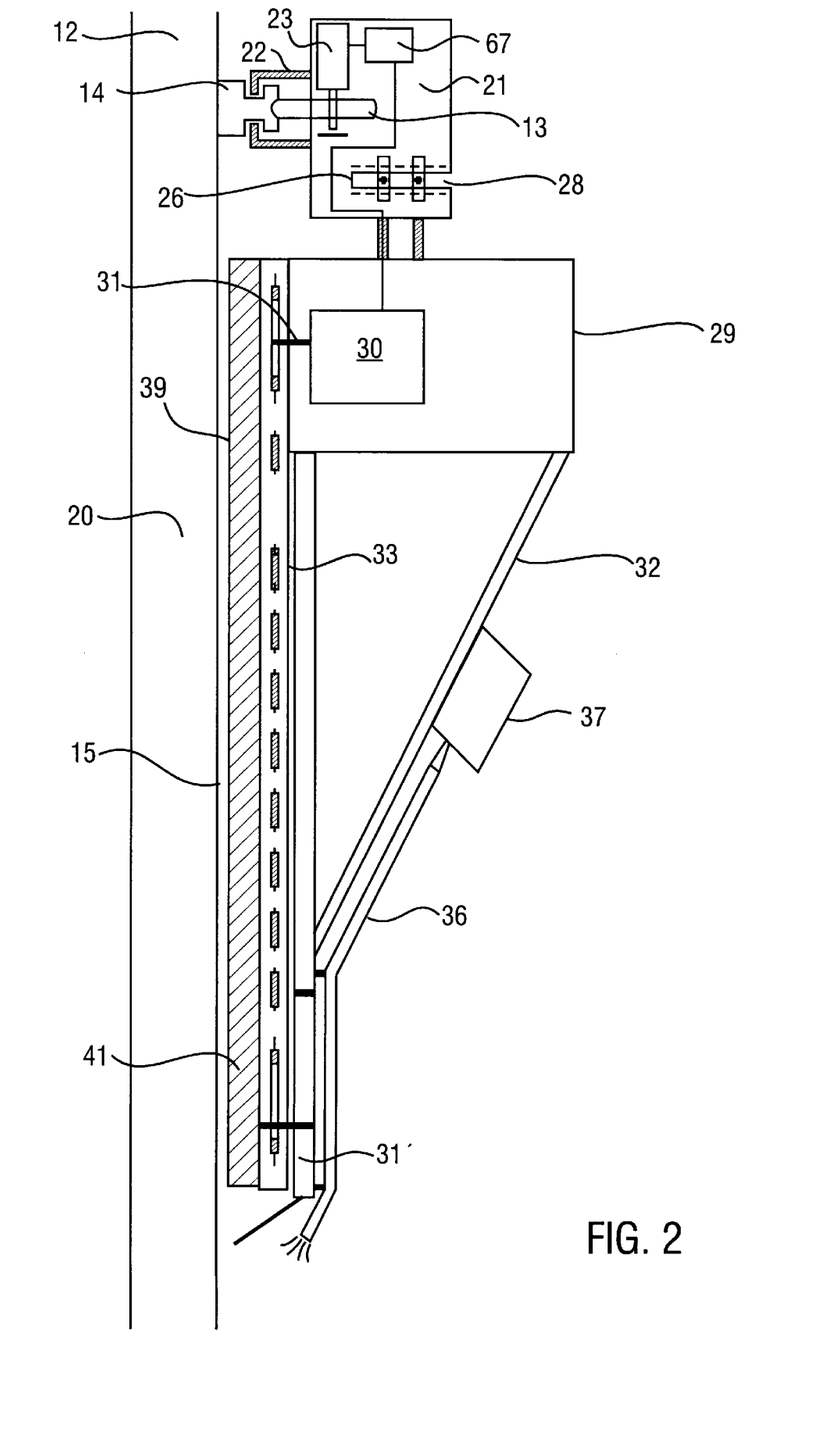
FIG. 2 illustrates sweeper mechanism 12 and rail 14 of FIG. 1.

FIG. 2 illustrates the sweeper mechanism 12 in greater detail. Specifically, FIG. 2 illustrates a sweeper mechanism 12 coupled to a rail 14 of an aquarium system. In general, sweeper mechanism 12 includes a housing 21. Housing 21 is generally a box-like structure that includes a slide gap 26. As discussed in more detail below, slide gap 26 allows for sweeper mechanism removal and for adjustment of the sweeper mechanism to ensure that the cleaning belt 15 of the sweeper mechanism 12 is positioned flush against the aquarium wall 20.

An electric motor 23 is positioned within the housing 21. Electric motor 23 is coupled to the coiled power cord 11 (not shown in FIG. 2) in a conventional manner such that motor 23 is energized and operational when power is provided to the motor via the power cord 11. A rail cog 13 is coupled to the drive shaft of motor 23. The cogs of rail cog 13 are positioned within a toothed rail 14 positioned in and affixed to the inner surface of the aquarium 20. Guide arms 22 surround a portion of the toothed rail 14 and the rail cog 13 and ensure that the rail cog 13 remains positioned within the toothed rail 14. Energization of the motor 23 causes the rail cog 13 to rotate within the toothed rail 14 such that the motor 23, housing member 21 (and anything coupled to the housing member 21) moves within the aquarium.

A sweeper mechanism housing 29 is coupled to the main housing 21 via a locking bracket with pegs 28. The pegs 28 are appropriately received within a suitable adjustable locking member in main housing 21. The relative position of the pegs 28 in relation to the main housing 21 allows the position of the sweeper mechanism housing 29 for proper positioning of cleaning belt 15, as discussed more fully below.

A sweeping motor 30 is positioned within sweeping mechanism housing 29. Sweeping motor 30 may be coupled to the power cord 11 via a suitable electrical connection such that sweeping motor 30 is energized and activated whenever (or shortly after) power is applied to main motor 23. A sweeper cog member 31 is coupled to the drive shaft of sweeping motor 30. A cleaning belt 15 comprising an algae brush 39 coupled to a fenestrated belt is coupled to the sweeper cog such that energization of the motor causes the belt to rotate when motor 30 is energized. The lower portion of belt 15 is received in a return cog member 31' that is coupled to the lower portion of a main sweeper arm 33. The lower portion of main sweeper arm 33 may be configured such that it can be adjusted with respect to the main portion of main sweeper arm 33 such that the overall length of the main sweeper arm 33 can be easily adjusted. Threaded pegs 35 may be used to affix the lower portion of main sweeper arm 33 to the main portion of main sweeper arm 33 when proper positioning is obtained.

The rail 14 may be positioned at a location above the water surface level such that the housings 21 and 29 are above the level of the water such that the motors 23 and 30 are not exposed to the water and need not be of a waterproof nature. The motors 23 and 30, and the contents of the housings, should be water resistant to prevent damage. Additionally, the motors, and the all the materials of sweeper arm 12 should be constructed of inert materials that will not leach heavy metals or other unwanted substances into the aquarium. Any plastics used to construct the sweeping mechanism should be resistant to damage from the type of ultraviolet light commonly used in aquariums.

Figure 3:
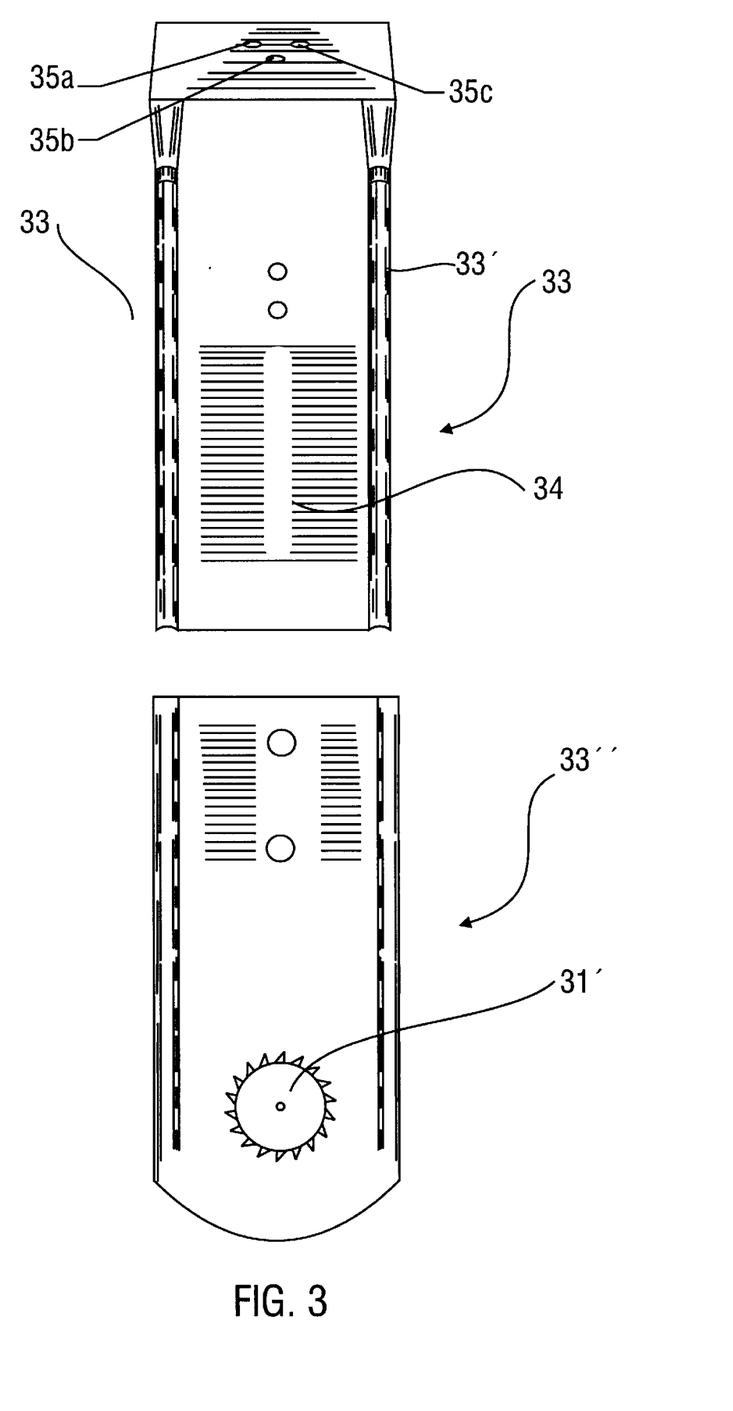
FIG. 3 illustrates a main scrubber arm 33.

The main scrubber arm 33 is illustrated in greater detail in FIG. 3. As illustrated, main scrubber arm 33 comprises a main portion 33' and a lower portion 33". The outer edges of the main portion 33' are slightly raised for reception into a groove on the lower portion 33" to help guide the relative movement of the two portions. The main portion 33' includes a cut out 34 that defies a slide groove. In operation, the upper portion 33' is adjusted with respect to the lower portion 33" until the desired overall length is established and then threaded pegs 35 are inserted through holes in the lower portion 33" to lock the members into place. Any suitable means, such as a fastening nut, may be used to hold the threaded pegs 35 in place. Serrated notched grooves may be provided on the main and lower portions to prevent sliding of the two members with respect to one another. Return cog member 31' is coupled to the lower portion of the main scrubber arm 33.

The upper portion of main scrubber arm 33' includes a flattened portion with three holes 35$a$, 35$b$, and 35$c$ for receiving three pegs to couple the main sweeping arm 33 to the base of the sweeping mechanism housing 29. Holes 32$a$ and 32$b$ are provided for attachment of a lower support arm 32 as discussed more fully below.

Referring back to FIG. 2, a lower support arm 32 is coupled to the main support arm 33 and to the sweeper mechanism housing 29 via pegs that enter holes in the main support arm 33 and the housing 29. All connecting seams associated with support arm 32 may be sealed with inert glue or cement. The main purpose of support arm 32 is to keep the cleaning belt 15 flush with the aquarium surface and to prevent bowing of the main scrubber arm 33.

In certain embodiments, a water pump 37 is coupled to the support arm 32 in an appropriate fashion. Water pump 37 may be any suitable, commercially available, power head. A hose 36 provides an outlet from the water provided by pump at a location near the lower end of the main scrubber arm 33. The main purpose of pump 37 is to provide a jet of water ahead of the sweeper arm and towards the aquarium surface to displace sediment that may have collected on the aquarium surface. A more detailed illustration of the water pump 37 and hose 36 is provided in FIG. 4.

Figure 4:
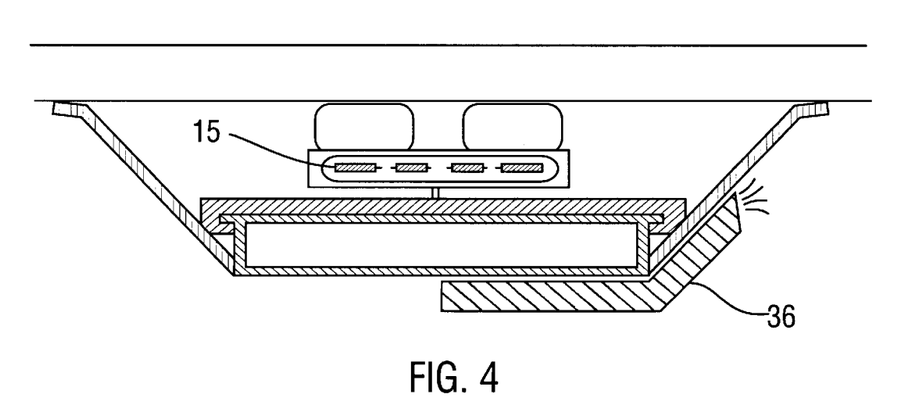
FIG. 4 generally illustrates a top-downview of the sweeper arm 33 of FIG. 3 and shows the end of discharge hose 36 positioned at the leading edge of the sweeper arm 33.
Figure 6:
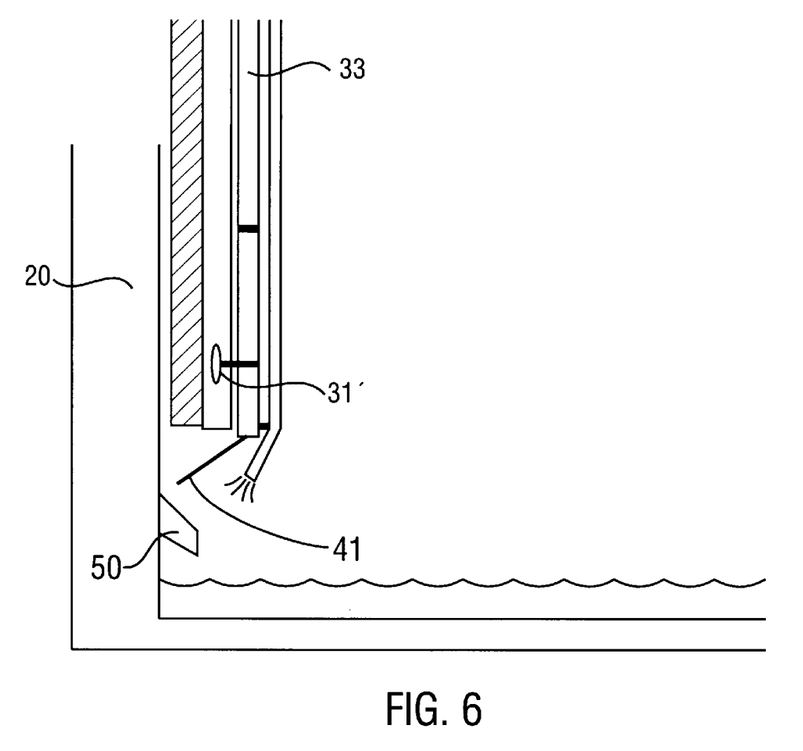
FIG. 6 illustrates an angled stop ledge that may be used with the present invention.

FIG. 4 generally illustrates a top-downview of the sweeper arm and shows the end of discharge hose 36 positioned at the leading edge of the sweeper arm 33 such that when the sweeping arm is moving, the water discharged from hose 36 leads the sweeping arm by some amount. FIG. 6 illustrates a side view of one embodiment of the sweeper arm. In this embodiment, the hose 36 is angled at an approximate 45 degree angle with respect to the horizontal such that the water is slightly angled down and in front of the sweeper arm. In this embodiment, the water pump 37 is configured to operate when the motors within the sweeping mechanism 12 are energized.

Referring back to FIG. 2, a sweeper arm housing 41 surrounds the sweeper arm. In general, the sweeper arm housing 41 protects the sweeper arm and return cog 31' from debris such that the risk of scratching because of a clogged cog or the lodging of debris between the scrubbing belt 15 and the aquarium wall 20 is reduced. A more detailed illustration of one embodiment of sweeper arm housing 41 is provided in FIGS. 5A and 5B.

Figure 5A:
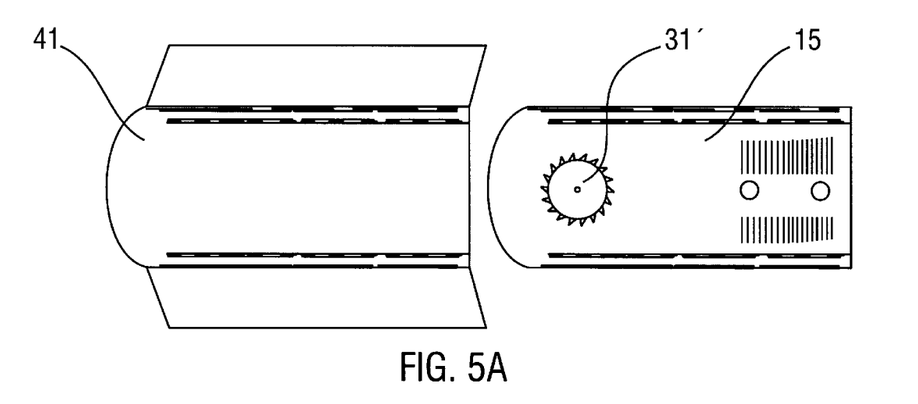
FIGS. 5A and 5B illustrate a sweeper arm housing.

Referring to FIG. 5A, the sweeper arm housing 41 is a shell member that fits over the main sweeper arm 33 and the cleaning belt 15. It may be held in place by a tongue and groove fit between the main housing 29 and the sweeper arm 33. A top-down cross-sectional view of the housing 41 is provided in FIG. 5B. As illustrated, the housing 41 comprises extending winged members 41a and 41b that are made of a semi-rigid material such that adjustment of the cleaning belt 15 to a position adjacent to the aquarium surface causes a bend in the winged arms 41a and 41b. These semi-rigid wings, snugly held against the aquarium surfaces, provide a barrier protecting the cleaning belt 15 from sediment and debris and from live forms (e.g., snails) that are often used in aquariums.

Figure 5B:
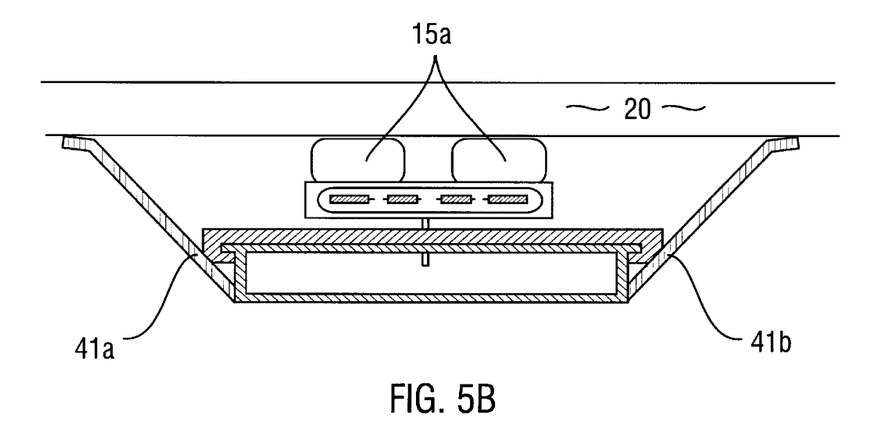

The winged members 41a and 41b are useful in removing small obstructions from the path of the sweeping mechanism 12. Some mobile organisms (e.g., snails) may be sufficiently large that they cannot be removed by the housing 41 and would interfere with the operation of the sweeping mechanism. To avoid this problem, smaller snails that may easily be removed from the glass by members 41a and 41b should be used.

Referring again to FIG. 2, the lower portion of sweeping arm 33 may be allowed to simply "hang" in the tank. In such embodiments, the housing 21 of the sweeping mechanism 12 and the cog 13 coupled to the motor 23 in the main housing is coupled to the rail as illustrated in FIG. 2.

For some tanks, the size of the sweeping arm 33 may be such that a singe toothed rail 14 is insufficient to support the sweeping arm. In these embodiments, a secondary tooth rail and cog system may be provided to hold the sweeping arm in place adjacent the aquarium surface. Moreover, in some applications, such as aquariums with fine substrates (e.g., sand) that could be shifted by currents and/or inhabitant movement, a stop ledge may be required to provide optimum operation of the sweeping apparatus. One example of this embodiment is provided in FIG. 6.

Referring to FIG. 6, the lower portion of a sweeper arm is illustrated in connection with an angled stop ledge 50. In the embodiment of FIG. 3, angled stop ledge 50 is angled 45 degrees below horizontal. The stop ledge 50 served both as a barrier against shifting substrate material and tends to reduce the risk that the sweeper arm will be clogged with substrate material. In the embodiment of FIG. 6, the stop ledge 50 is constructed of acrylic, although other suitable materials may be used. In many instances, it will be important that the arrangement of the tank be such that the support ledge 50 is unobstructed and that the substrate depth is relatively uniform.

One potential source of interference for the sweeping mechanism 12 is anemones that could adhere to the ledge 50 and block movement of the sweeping mechanism. To avoid this problem, such anemones should be avoided, or the sweeping mechanism 12 should be activated only after such anemones have found a suitable resting place that would not interfere with sweeper operation.

Referring back to FIG. 2, a timer (not shown) may be coupled to the motors 23 and 30 for activating the motor on a periodic basis to cause the sweeping mechanism 12 to traverse the toothed rail 14 and to cause the scrubber belt 15 to clean the viewing surfaces of the tank 20 of unwanted algae. The times at which the timer activates the sweeping mechanism 12 may vary from application to application. In general, however, the timer may be set to clean the viewing surfaces of the tank during the night (for a tank that is viewed in the day) or vice-versa for a night viewed tank. In one embodiment, the timer activates the motor and a switch positioned near the rail 14 causes the power to be removed when the sweeping mechanism 12 has traversed the entire perimeter of the tank viewing surface.

To preserve the aesthetics of the aquarium, the scrubbing mechanism 12 may be positioned within an obscured area when at rest. For example, in the aquarium of FIG. 1A, the scrubbing arm may be configured to rest at a position where it is hidden from a front-on viewer by the tank overflow 2, or it may be positioned in a non-visible corner of the tank. An alternate arrangement for "hiding" the sweeping mechanism 12 is illustrated in FIG. 7.

Figure 7:
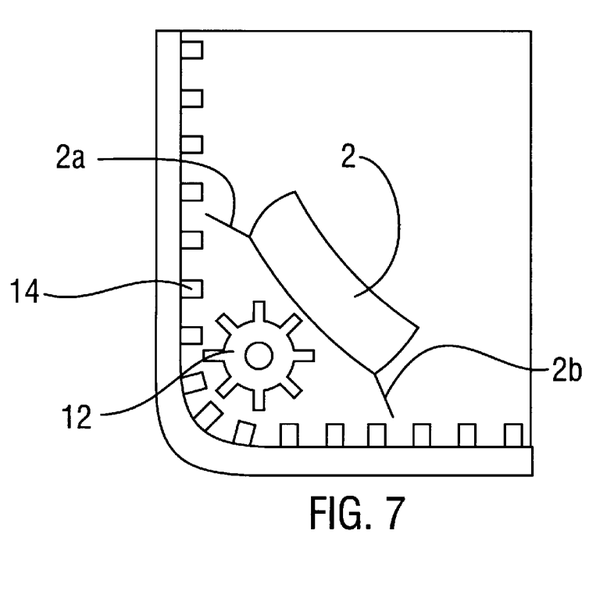
FIG. 7 illustrates a vertical concealment wall positioned within a tank to provide a visible barrier that hides a sweeping arm when it is at rest.

In FIG. 7, a vertical concealment wall 2 is positioned within the tank to provide a visible barrier that hides the sweeping arm when it is at rest. In some tanks with side positioned overflows, a separate concealment wall may not be necessary and the wall 2 may be a part of the overflow. One-way flaps 2a and 2b may also be provided to further reduce the visibility of the sweeping arm.

Although not illustrated in FIG. 7, additional aquarium height may be required and additional top-cover cabinetry may be necessary to conceal the rail 14 and the surface portion of the sweeping mechanism 12 from view.

Figure 8A:
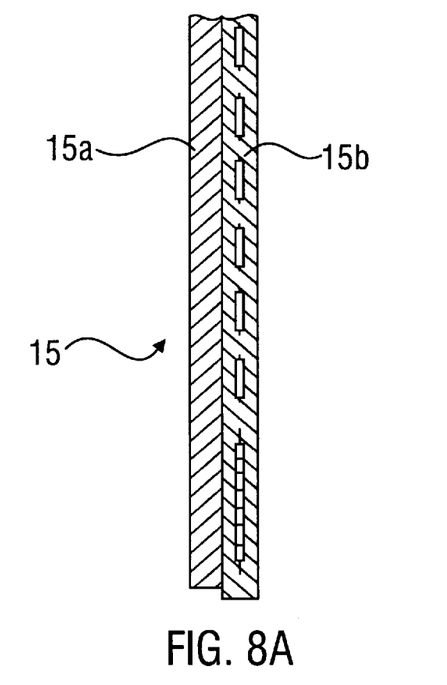
FIGS. 8A and 8B illustrate the cleaning belt 15 of FIG. 1 in greater detail.
Figure 8B:
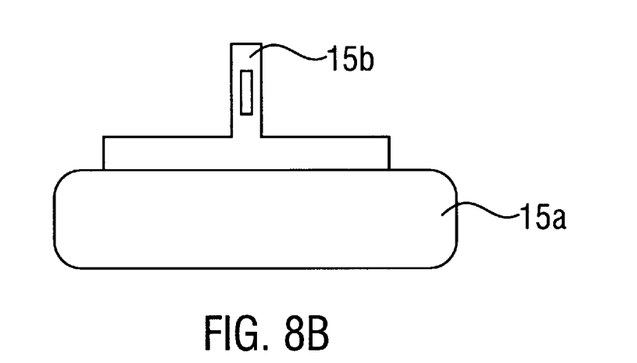

FIGS. 8A and 8B illustrate the construction of the cleaning belt 15 in greater detail. Referring to FIG. 8A, the cleaning belt 15 consists of a cleaning material 15a (that may comprise a commercially available algae brush material or the like) and a support 15b with fenestrations established therein. The fenestrations should be of such a size that receive the cog portions of the cog members 31 and 31'. A belt may be formed by looping the material 15 of FIG. 8A to form a loop and coupling the two ends weigh an adjustable C-clamp. FIG. 8B illustrates a cross section of the belt 15. Thicker cleaning materials 15a may be used. In such embodiments, the depth of the fenestrations may need to be increased to ensure that the cog members 31 and 31' impart sufficient torque to clean the viewing surfaces of the tank.

Figure 9A:
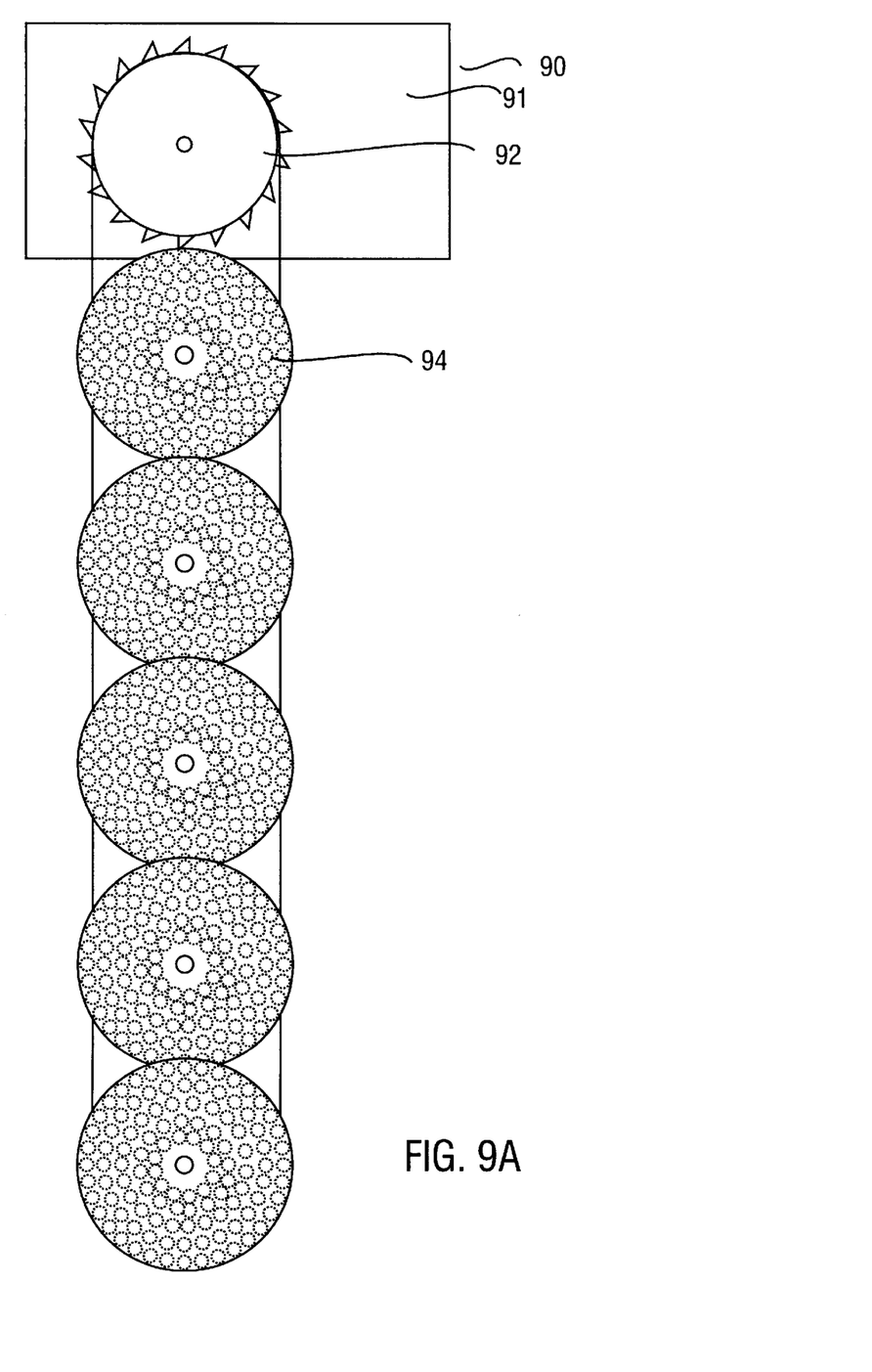
FIGS. 9A and 9B illustrate an alternate embodiment of the sweeper mechanism.
Figure 9B:
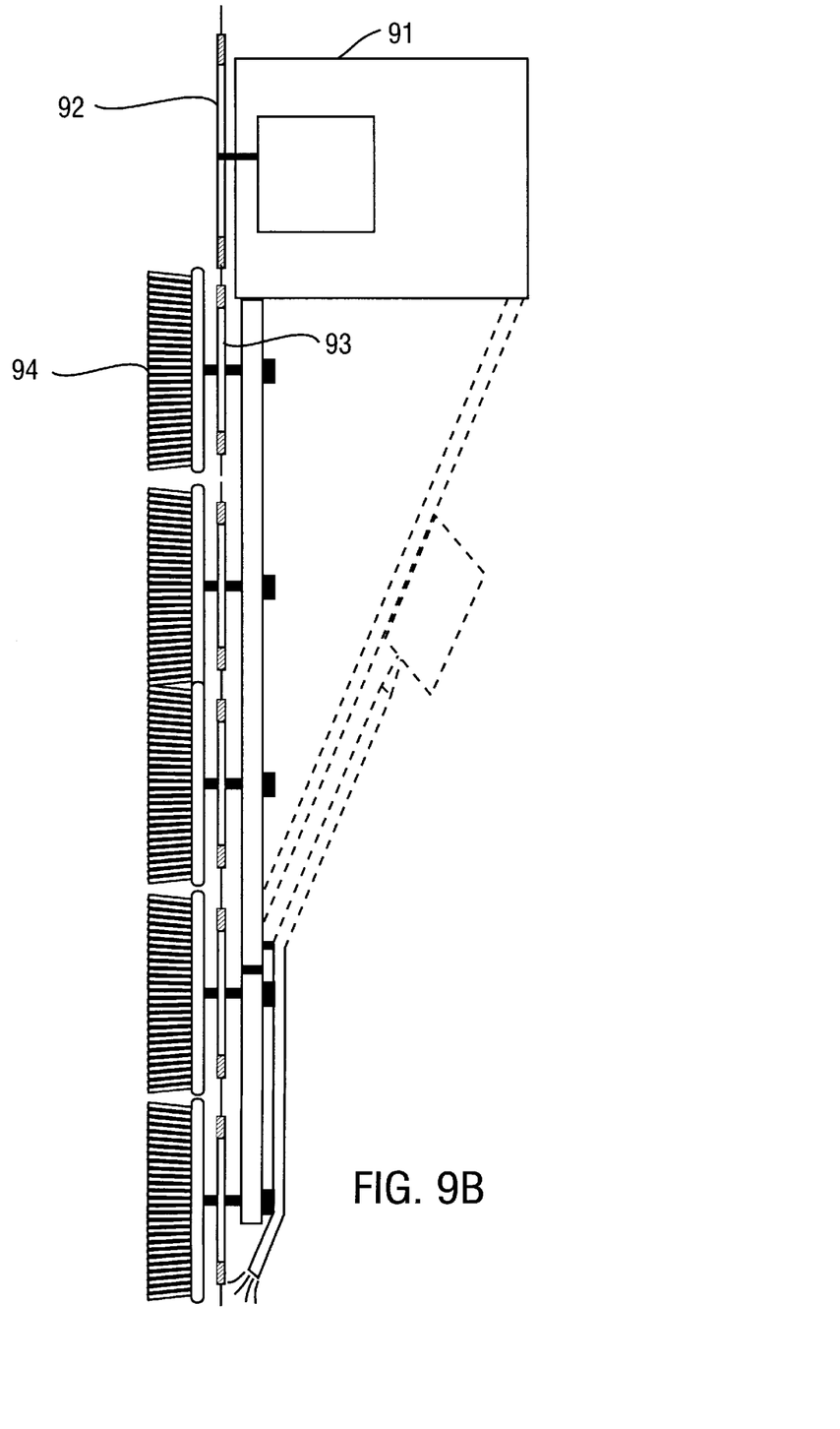

Alternate embodiments of the present invention are envisioned in which the cleaning belt and brush arrangement is replaced with a multiple brush and cog arrangement where multiple, circular cogs are coupled to the sweeper arm such that energization of the arm causes rotation of the cogs and a circular cleaning motion. One such embodiment is illustrated in FIGS. 9A and 9B. In general, FIGS. 9A and 9B illustrate an alternate design of the sweeper arm 90 where a motor (not illustrated) is enclosed in a motor housing 91. A main drive cog 92 is coupled to the shaft of the motor and multiple cleaning cogs 93 are coupled to the main cog such that activation of the motor causes both the main and the cleaning cogs to rotate. Detachable cleaning brushes 94 formed of a suitable material, are coupled to the cleaning cogs 93. The brushes may be attached to the cleaning cogs by rubber pegs on the cleaning brushes which fit within holes on the cleaning cogs.

Figure 10:
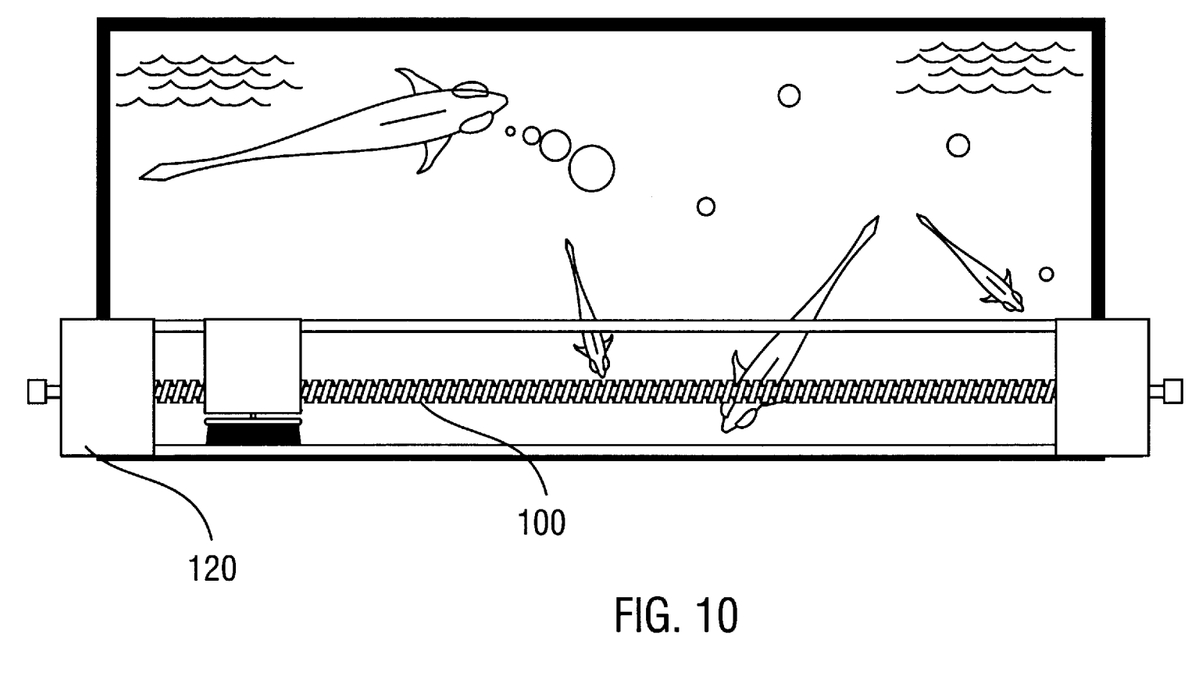
FIG. 10 illustrates an alternate approach for moving the sweeping mechanism across a viewing surface using a worm gear and pawl approach.

The above description of several embodiments is made by way of example only and not for purposes of limitation. For example, the sweeper mechanism of the present invention may be adopted to operate in different delivery systems, can be adopted for retrofit use in an existing tank, or can be part of a new aquarium system. For example, the use of a tooth rail and cogs system to move the sweeping arm across the viewing surface may be replaced with a worm gear and pawl system. Such an alternate embodiment is generally illustrated in FIG. 10, where the sweeping arm is coupled to a worm gear 100 by a pawl assembly (not illustrated) in conventional fashion. A worm gear motor 120 is provided such that energization of the worm gear motor causes rotation of the worm gear 100 and movement of the sweeping arm across the viewing surface.

The present invention is intended to be limited only by the scope and spirit of the following claims.

What is claimed is:

1. An aquarium system comprising:
   an aquarium, the aquarium defining at least one viewing surface; and
   apparatus for cleaning the viewing surfaces of an aquarium comprising:
   a sweeping mechanism including a cleaning material;
   a mechanism for positioning the sweeping mechanism, and thus the cleaning material, proximate to the viewing surface of the aquarium; and
   a first motor for moving the sweeping mechanism across the viewing surface of the aquarium such that the cleaning material is swept across the viewing surface.

2. The aquarium system of claim 1 wherein the sweeping mechanism comprises a main arm, main cog coupled to the main arm, and a plurality of cleaning cogs coupled to the main cog.

3. An aquarium system comprising:
   an aquarium, the aquarium defining at least one viewing surface; and
   apparatus for cleaning the viewing surfaces of an aquarium comprising:
   a sweeping mechanism including a cleaning material;
   a mechanism for positioning the sweeping mechanism, and thus the cleaning material, proximate to the viewing surface of the aquarium; and
   a first motor for moving the sweeping mechanism across the viewing surface of the aquarium such that the cleaning material is swept across the viewing surface;
   a rail cog coupled to the first motor, the rail cog having projecting teeth, and wherein the mechanism for positioning the sweeping mechanism proximate the viewing surface of the aquarium comprises a toothed rail coupled to the aquarium viewing surface that receives the teeth of the cog rail.

4. The aquarium system of claim 3 wherein the first motor is coupled to a worm gear that is received by the sweeping mechanism such that energization of the motor causes the worm gear to rotate in such a manner that movement of the sweeping mechanism is affected.

5. An aquarium system comprising:
   an aquarium, the aquarium defining at least one viewing surface; and
   apparatus for cleaning the viewing surfaces of an aquarium comprising:
   a sweeping mechanism including a cleaning material and a main arm extending in a direction approximately parallel to the viewing surface of the aquarium, wherein the cleaning material comprises a belt of cleaning material and wherein the main arm includes rotating members for receiving the belt of the cleaning material;
   a mechanism for positioning the sweeping mechanism, and thus the cleaning material, proximate to the viewing surface of the aquarium; and
   a first motor for moving the sweeping mechanism across the viewing surface of the aquarium such that the cleaning material is swept across the viewing surface.

6. The aquarium system of claim 5 wherein the sweeping mechanism includes a second motor that is coupled to the rotating members for rotating the rotating members and the belt.

7. The aquarium system of claim 6 wherein the rotating members comprise cogs having cog teeth and wherein the belt defines fenestrations that received the cog teeth.

8. The aquarium system of claim 5 further including a water pump coupled to the main arm, a hose coupled to the water pump, wherein the outlet of the hose is positioned to provide a stream of water near the lower potion of the main arm for removing debris from the path of the sweeping mechanism.

9. The aquarium system of claim 5 further including a support arm coupled to the main arm to prevent bowing of the main arm as the sweeping mechanism traverses the viewing surface of the aquarium.

10. A self-cleaning aquarium system having at least one viewing surface, the system comprising:
    a guide member positioned across the viewing surface of the aquarium;
    a sweeping mechanism having a movable member positioned within the guide member, the sweeping mechanism further including: (i) an arm extending downward into the aquarium in a direction substantially parallel to the viewing surface of the aquarium, (ii) a cleaning surface positioned proximate to the viewing surface of the aquarium; and (iii) means for moving the cleaning surface relative to the arm; and
    means for moving the movable member within the guide member to cause the cleaning surface of the sweeping mechanism to traverse the viewing surface of the aquarium, thus cleaning the viewing surface of the aquarium.

11. The system of claim 10 wherein the means for moving the movable member includes a motor coupled to the movable member and a timer for activating the motor on a periodic basis to cause the sweeping member to move across the viewing surface of the aquarium on a periodic basis.

12. The system of claim 10 wherein the means for moving comprises a worm gear and pawl arrangement.

13. The system of claim 10 wherein the sweeping mechanism comprises a plurality of rotating cogs and wherein the cleaning surface comprises cleaning brushes affixed to the cogs.

14. A self-cleaning aquarium system having at least one viewing surface, the system comprising:
    a guide member positioned across the viewing surface of the aquarium, the guide member comprising a toothed rail;
    a sweeping mechanism having a movable member positioned within the guide member, the sweeping mechanism further including a cleaning surface positioned proximate to the viewing surface of the aquarium, wherein the movable member comprises a cog received in the rail; and
    means for moving the movable member within the guide member to cause the cleaning surface of the sweeping mechanism to traverse the viewing surface of the aquarium, thus cleaning the viewing surface of the aquarium.

15. A self-cleaning aquarium system having at least one viewing surface, the system comprising:
    a guide member positioned across the viewing surface of the aquarium;
    a sweeping mechanism having a movable member positioned within the guide member, the sweeping mechanism further including a cleaning surface positioned proximate to the viewing surface of the aquarium, wherein the cleaning surface comprises a belt formed of cleaning material; and means for moving the movable member within the guide member to cause the cleaning surface of the sweeping mechanism to traverse the viewing surface of the aquarium, thus cleaning the viewing surface of the aquarium.

16. A self-cleaning aquarium system having at least one viewing surface, the system comprising:

a guide member positioned across the viewing surface of the aquarium;

a sweeping mechanism having a movable member positioned within the guide member, the sweeping mechanism further including a cleaning surface positioned proximate to the viewing surface of the aquarium;

means for moving the movable member within the guide member to cause the cleaning surface of the sweeping mechanism to traverse the viewing surface of the aquarium, thus cleaning the viewing surface of the aquarium; and a concealment member positioned within the aquarium to obscure the view of the sweeping mechanism when not in operation.

17. A self-cleaning aquarium system having at least one viewing surface, the system comprising:

a guide member positioned across the viewing surface of the aquarium;

a sweeping mechanism having a movable member positioned within the guide member, the sweeping mechanism further including a cleaning surface positioned proximate to the viewing surface of the aquarium wherein the sweeping mechanism includes an arm extending downward into the aquarium in a direction substantially parallel to the viewing surface of the aquarium and wherein the system further includes a stop ledge positioned within the aquarium at a position near a lower end of the arm; and means for moving the movable member within the guide member to cause the cleaning surface of the sweeping mechanism to traverse the viewing surface of the aquarium, thus cleaning the viewing surface of the aquarium.

18. A self-cleaning aquarium system having at least one viewing surface, the system comprising:

a guide member positioned across the viewing surface of the aquarium;

a sweeping mechanism having a movable member positioned within the guide member, the sweeping mechanism further including a cleaning surface positioned proximate to the viewing surface of the aquarium;

means for moving the movable member within the guide member to cause the cleaning surface of the sweeping mechanism to traverse the viewing surface of the aquarium, thus cleaning the viewing surface of the aquarium;

wherein the movable member comprises a rail cog, the means for moving the movable member comprises a motor coupled to the rail cog, and wherein the guide member comprises a toothed rail positioned across the viewing surface of the aquarium where the toothed rail receives the rail cog.

19. The system of claim 18 wherein the toothed rail is positioned above the water level of the aquarium such that the motor is above the water level.

20. A sweeping mechanism for an aquarium including a guide mechanism positioned across a viewing surface of the aquarium, the sweeping mechanism comprising:

a first movable member for positioning within the guide mechanism;

a first motor coupled to the movable member, wherein activation of the first motor causes the movable member to move within the guide member moving the sweeping mechanism across the viewing surface;

a main housing surrounding and coupled to the first motor;

a secondary housing coupled to the main housing;

a main arm extending from the secondary housing in a direction substantially parallel to the viewing surface of the aquarium;

a second motor positioned within the secondary housing;

a second movable member coupled to the second motor and to the main arm;

a cleaning belt coupled to the second movable member, the cleaning belt extending in a direction parallel to the main arm, the cleaning belt positioned such that operation of the second motor causes the cleaning belt to rotate to provide a movable cleaning surface for cleaning the viewing surface of the aquarium.

21. The sweeping mechanism of claim 20 wherein the first movable member is a toothed cog.

22. The sweeping mechanism of claim 20 wherein the first motor is coupled to a timer that causes the second motor to operate on a timed basis.

23. The sweeping mechanism of claim 20 wherein the main arm consists of upper and lower positions that may be adjusted with respect to one another so that the length of the main arm can be adjusted.

24. The sweeping mechanism of claim 20 wherein the second movable member comprises a toothed cog and the cleaning belt comprises a belt defining fenestrations that receive the teeth of the cog.

25. The sweeping mechanism of claim 24 further including a protective housing surrounding the main arm and partially surrounding the cleaning belt.

* * * * *